US006904059B1

(12) United States Patent
Newson et al.

(10) Patent No.: US 6,904,059 B1
(45) Date of Patent: Jun. 7, 2005

(54) ADAPTIVE QUEUING

(75) Inventors: Paul E. Newson, Bellevue, WA (US); Roderick M. Toll, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 892 days.

(21) Appl. No.: 09/800,381

(22) Filed: Mar. 6, 2001

(51) Int. Cl.[7] .................................. H04L 12/26
(52) U.S. Cl. ....................................... 370/516
(58) Field of Search ................... 370/230, 412, 370/498, 503, 516; 710/52, 56

(56) References Cited

U.S. PATENT DOCUMENTS

| | | | |
|---|---|---|---|
| 6,452,950 B1 * | 9/2002 | Ohlsson et al. | 370/516 |
| 6,658,027 B1 * | 12/2003 | Kramer et al. | 370/516 |
| 6,700,895 B1 * | 3/2004 | Kroll | 370/412 |
| 2002/0101885 A1 * | 8/2002 | Pogrebinsky et al. | 370/516 |

OTHER PUBLICATIONS

Wolaver D.; "Jitter Analysis Enters the Digital Age"; Electronic Products Magazine, 2000, vol. 43, No. 5 (Oct.) p. 91–93.

Libin Dong, et al.; "Effect of Scheduling Jitter on End-–to–End Delay in TDMA Protocols"; Conference Title: Proceedings Seventh International Conference on Real-–Time Computing Systems, and Applications; Conference Date: Dec. 12, 2000; University of Pittsburgh.

Hersent, O.G. et al., "IP Telephony: Packet–Based Multimedia Communications Systems", Published by Addison Wesley, Oct. 1999, ISBN: 0201619105 (Entire Book is being Submitted).

* cited by examiner

Primary Examiner—Chi Pham
Assistant Examiner—Derrick W. Ferris
(74) Attorney, Agent, or Firm—Woodcock Washburn LLP

(57) ABSTRACT

Methods and systems for dynamically adjusting the length of delay before playback as a function of the amount of transmission jitter is disclosed, whereby a target error rate is received, error rates at different delays are tracked and current delay is adjusted as a function of tracked error rates.

2 Claims, 6 Drawing Sheets

ADAPTIVE QUEUING

FIELD OF THE INVENTION

The present invention is directed to the field of data transmission, and in particular to the dynamic adjustment of length of delay before playback in response to network and system conditions.

BACKGROUND OF THE INVENTION

Typically in data transmission over a network, a transmitter transmits certain size packets periodically and a receiver receives the transmitted packets and plays them. However, although the receiver transmits at fixed intervals, there is some variation in the time intervals at which transmitted packets are received by the receiver. For example, a transmitter may transmit a packet every 100 ms, so that at time 0, packet A is transmitted, at time 0+100, packet B is transmitted and at time 0+200, packet C is transmitted. The receiver, however, may receive packet A at time 0+10, packet B at time 0+110 (a 100 ms interval) and packet C at time 0+230 (a 120 ms interval).

The variation in the time intervals between which packets are received is called jitter. Jitter causes problems for real-time streaming data applications because proper data reproduction requires consistent playback timing. Streaming data transfer differs from other types of data transfer in that the data transferred has a temporal aspect. Once the receiver begins to reproduce the stream of data at the destination, it must continue to reproduce that data stream continuously according to the temporal structure of that data, or else the reproduction of that data will have lower quality. As an example, without limitation, audio data has this structure. A stream of audio data must be reproduced at the destination with the right temporal structure, or it will not sound correct to the listener. Therefore if a packet arrives late because of jitter, the receiver may not be able to play a continuous stream of data if the packet is not available when required to maintain consistent playback timing. The packet unavailability causes the playback to "break up" and reduces playback quality.

To compensate for playback errors, streaming data applications communicated over packet-based networks typically use a "jitter buffer" to implement a measure of delay before playback on the receiver. As the receiver receives packets, it does not play them back right away, but instead, copies them to a jitter buffer. The data stream is then played from the jitter buffer. If the size of the jitter buffer is larger than the amount of jitter present in the network, then the receiver will be able to play back a smooth and unbroken stream of data, because there will always be data available in the jitter buffer for playback.

The jitter buffer, however, adds latency to the playback. In the context of streaming data transmission and playback, latency is the time between input of data by the sender and rendering of that data by the receiver. The length of the jitter buffer increases latency. If the jitter buffer is 50 milliseconds (ms) in length, there may be up to 50 ms of delay attributable to the size of the jitter buffer in addition to any additional latency attributable to the network and other components of the communications system. Thus it is desirable to have the smallest jitter buffer that provides adequate playback quality.

The size of jitter buffer required to provide adequate playback quality will change as conditions change on the network between the transmitter and receiver. Thus it would be desirable to have a method to automatically adjust the size of the jitter buffer, thus adjusting the length of delay of playback, in response to changing network conditions.

SUMMARY OF THE INVENTION

In accordance with the invention, incoming packets are inserted into a queue (hereinafter referred to as a jitter buffer). The packets are not released to be played until a certain number of packets are received and stored in the jitter buffer. The number of packets that must be received before playback starts is referred to herein as the "high-water mark" which effectively determines the length of delay before playback. A high-water mark appropriate for the current network and host conditions is determined. If there is little or no jitter, the high-water mark can be very low or even zero, whereas where there is significant jitter, the high-water mark should be set correspondingly higher. As jitter changes in response to network and host conditions, the high-water mark and thus the length of delay before playback changes accordingly, to compensate for the jitter.

According to another aspect of the invention, the high-water mark is dependent on the desired quality of playback. As the high-water mark is increased, the number of reproduction errors approaches zero, but latency increases. A target error rate is selected based on the type of application. Gaming applications, for example, generally desire low latency and, hence, exchange low latency for a higher error rate.

After a target high-water mark is selected, the high-water mark is thereafter dynamically adjusted to approach the target error rate for the given application. Hence, as data segments (which in audio applications are referred to as talkspurts) are processed, the error rate for the data segment or talkspurt is determined. The error rate experienced at the current high-water mark and its associated delay time is compared to the error rate experienced at other delay times and if the target error rate has not been achieved, length of delay may be increased or decreased by increasing or decreasing the high-water mark, in order to make the error rate approach the target error rate.

According to an aspect of the invention, the error rate experienced for each high-water mark is tracked. Results are stored in a data structure such as, but not limited to, an array. The array or other suitable data structure is updated with the error rate of each segment. For example, if the error rate is better (lower) than the error rate required, and the length of delay is not zero, the length of delay may be decreased by the time interval represented by one packet. To determine whether or not the length of delay will be decreased, the disclosed invention checks to see which delay time results in an error rate closer to the target error rate and the high-water mark is set to which ever delay time results in an error rate closer to the target error rate.

The disclosed invention is appropriate for systems that use both variable and fixed length packets.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

To compensate for playback error, communications applications over packet-based networks typically use a jitter buffer in which packets of data are stored and from which packets are played back. The consequences of choosing a jitter buffer that is too small will be excessive playback errors. The consequences of choosing a jitter buffer that is too large is excessive latency. Typically the size of a jitter buffer is static, so that even if a ideal jitter buffer size is chosen, network conditions may change, rendering the jitter buffer size no longer ideal. The invention contemplates the use of a dynamically-sized buffer resulting in a dynamically-hanging length of delay.

Illustrative Computer Network Environment

Figure 1:
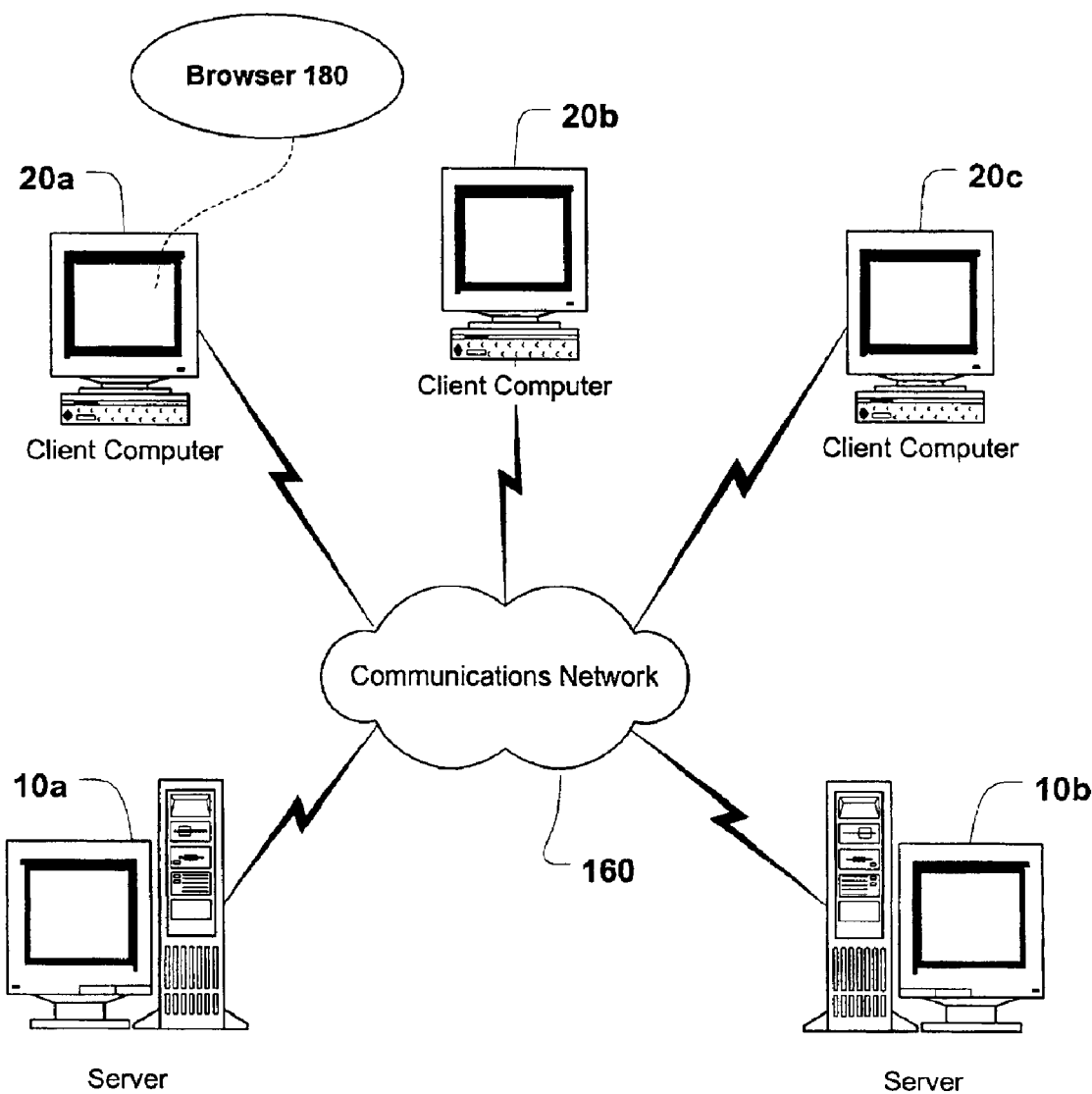
FIG. 1 is a block diagram representing an exemplary network environment with a server in accordance with the present invention.

The present invention may be deployed as part of a computer network. In general, the computer network may comprise both server computers and client computers deployed in a network environment. FIG. 1 illustrates an exemplary network environment, with a server in communication with client computers via a network, in which the present invention may be employed. As shown in FIG. 1, a number of servers 10a,10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10. In addition to using the network 160 in a client-server configuration, client computer 20a, 20b, 20c may communicate directly with each other in a peer-to-peer configuration.

The present invention is preferably deployed in a network environment, particularly where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transmitted by one of the common protocols (e.g., TCP/IP, UDP, etc.) is generally broken into packets. The packets are addressed to one of the other computers 20a, 20b, 20c, 10a, 10b connected to network 160. The addressed computer receives the packets, strips out the information content of the packets, and reassembles the transmitted electronic information. The electronic information may be audio, video, text and so on.

A transmission of audio data, as in a gaming application, can be sent by a client application program to a server or to another client, depending on the game configuration. If the data is transmitted to a server, the server may transmit this data to another client application program. The client process may be active in a first computer system, and the server process may be active in a second computer system, communicating with one another over a communications medium, thus providing distributed functionality and allowing multiple clients to take advantage of the capabilities of the server.

Thus, the present invention can be utilized in a computer network environment having client computers for accessing and interacting with the network and a server computer for interacting with client computers. However, the systems and methods for providing audio data stream transmission in accordance with the present invention can be implemented with a variety of network-based architectures, and thus should not be limited to the example shown. The present invention will now be described in more detail with reference to a presently illustrative implementation.

Transmission of Audio Data through a Network

It should be understood that although the following illustrative example is described in terms of audio data transmission, the present invention encompasses the storage and playback of other types of data as well, such as video data or any other data having a sequential temporal aspect, as described above.

Figure 2:
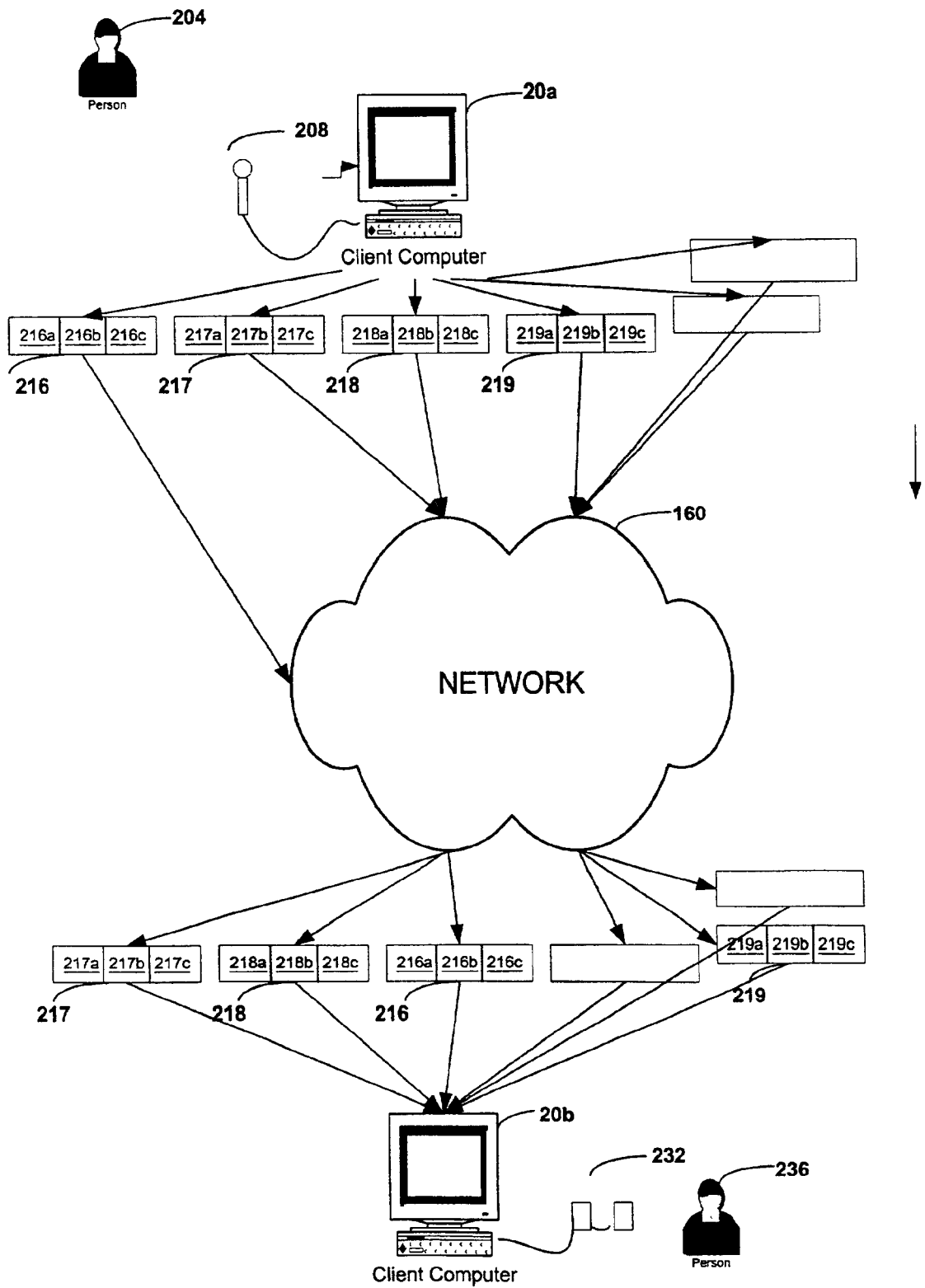
FIG. 2 is a block diagram representing the flow of audio data in an exemplary network environment.

FIG. 2 is a block diagram of an exemplary network environment in which a user 204 inputs audio data through an audio input device 208, such as a microphone, connected to a transmitting device 20a for transmission to a receiving device 20b through a network 160. The transmitted audio data received by receiving device 20b may be output to an audio output device 232, such as speakers, to user 236.

Everything that is sent through a packet-switched network is sent in packets, e.g., 216, 217, 218, 219, etc., typically, although not exclusively, in IP format. Packets 216, 217, 218, 219, etc. can be fixed in length or variable in length. Each packet 216, 217, 218, 219, etc. typically contains a header 216a, 217a, 218a, 219a, etc., payload 216b, 217b, 218b, 219b, etc. and trailer 216c, 217c, 218c, 219c, etc.

Referring now to packet 216 as an exemplary packet, header 216a contains information needed to direct the packet to its intended destination, (the intended receiver's IP address), the sender's IP address, how many packets are contained in the data stream, the sequence number of this packet, synchronization bits and in some cases, protocol (the type of packet being transmitted, including but not limited to e-mail, Web page, streaming video or audio) and length of packet. Length of packet is required for variable length packets.

Payload 216b contains all or a portion of the actual data stream to be transmitted. If a packet 216 is a fixed-length packet and the data to be transmitted is less than the fixed length, payload 216b is typically padded with blanks. Trailer 216c typically contains data for error checking and a few bits for an end-of-packet indicator.

Once packet 216 is assembled, packet 216 is released to a routing system (not shown.) Routers are special-use computers that examine the destination address and determine the best available route at the time the packet is transmitted. Routers examine the destination address, compare it to lookup tables to find out where to send the packet, and ascertain current network conditions to determine the best available route. Once packet 216 arrives at its destination, header 216a and trailer 216c are stripped off. Payload 216b is reassembled into a data stream with the payloads of other packets 217, 218, 219 etc. based on the numbered sequence of packets 216, 217, 218, 219 etc.

Figure 3:
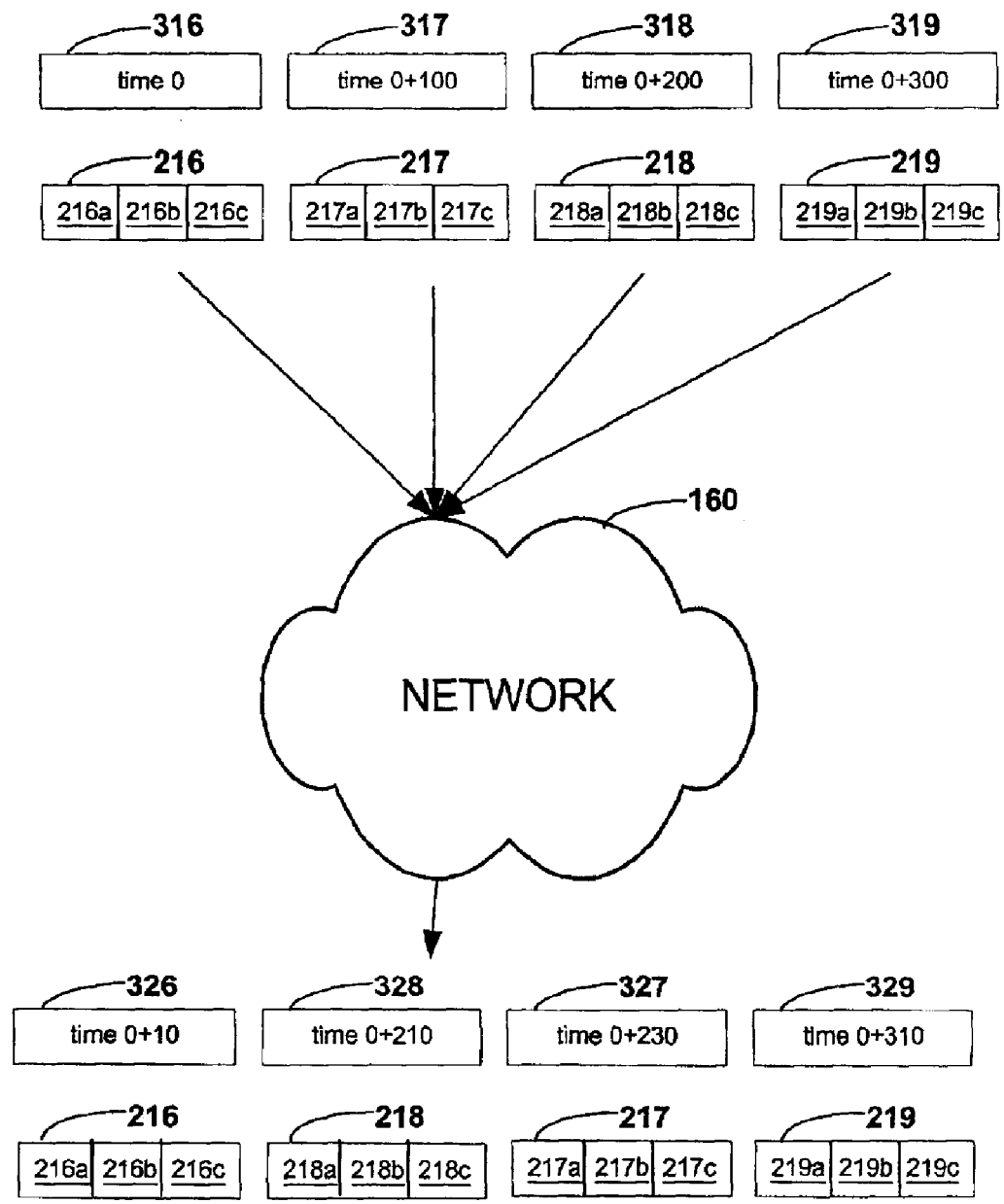
FIG. 3 is a block diagram representing jitter in an exemplary network environment.

Each packet released may travel by a different route and may take a different amount of time to arrive at its destination. FIG. 3 depicts the transmission time and arrival times for packets transmitted through a packet-switched network 160. For example, if packets 216, 217, 218, 219, etc. are 100 millisecond (ms) packets containing audio data, packet 216 may be transmitted from transmitting device 20a at time 0 316 and be received by receiving device 20b at time 0+10 326, packet 217 may be transmitted at time 0+100 317 and be received at time 0+230 327, packet 218 may be transmitted at time 0+200 318 and be received at time 0+210 328 and packet 219 may be transmitted at time 0+300 319 and be received at time 0+310 329. Thus the amount of time it took for packet 216 to arrive at its destination was 10, for packet 217 was 120, for packet 218 was 10 and for packet 219 was 10. The variation in the time intervals between which packets 216, 217, 218 and 219 are received by receiving device 20b is called jitter.

Jitter causes problems for real-time audio applications because proper audio reproduction requires that the packets 216, 217, 218, etc. must be received by the time receiving device 20b attempts to play them back. For example, if receiving device 20b starts to play packet 216 at time 0+10, at time 0+110 packet 217 needs to be played back to get a continuous audio stream, but at time 0+110 packet 217 has not arrived. Packet 217 does not arrive until time 0+230. This results in a loss of audio data, reducing sound quality. User 236 hears the sound "breaking up".

Figure 4:
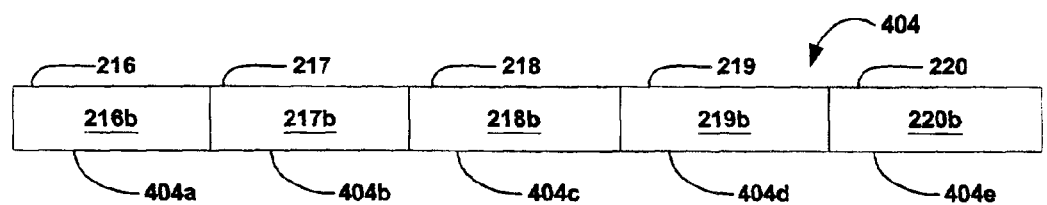
FIG. 4 is a block diagram representing reassembly of packets of data and storage in a jitter buffer.

To compensate for jitter, communications applications deployed on packet-based networks typically use a jitter buffer 404 as depicted in FIG. 4 to store audio data until a certain number of packets 216, 217, 218, 219, 220 are received by receiving device 20b. As packets 216, 217, 218, 219, 220 are received, audio data 216b, 217b, 218b, 219b, 220b from packets 216, 217, 218, 219, 220 are copied into jitter buffer 404 in the sequence in which they are to be played. If the size of jitter buffer 404 is larger than the amount of jitter present in network 160, receiving device 20b will be able to play back a smooth and unbroken stream of audio, because audio packets 216, 217, 218, 219 and 220 are available in jitter buffer 404 at the time the packets are needed for playback.

Referring now to FIG 4, if, as shown, a jitter buffer 404 500 milliseconds long is chosen, at time 0+10 packet 216 is received and stored in jitter buffer 404 cell one 404a, at time 0+210 packet 218 is received and stored in jitter buffer 404 cell three 404c, at time 0+230 packet 217 is received and stored in jitter buffer 404 cell two 404b, at time 0+310 319 packet 219 is received and stored in jitter buffer 404 cell four 404d, and at time 0+410 (not shown in FIG. 3) packet 220 is received and stored in jitter buffer 404 cell five, 404e. At time 0+500, receiving device begins to play and will be able to play a continuous stream of audio because 500 milliseconds worth of audio data is stored in jitter buffer 404.

If, however, too small a jitter buffer is chosen for the amount of jitter present in network 160, a similar result to that discussed above with respect to a situation where no jitter buffer exists: that is, poor sound quality will result. The ideal size of a jitter buffer may change if conditions on the network change so that a jitter buffer that initially was ideal may become too large or too small. The consequence of choosing a jitter buffer that is larger than required is an increase in latency. If the jitter buffer is 500 milliseconds in length, there may be 500 milliseconds of delay attributable to the jitter buffer in addition to any additional latency attributable to the network and other components of the audio communications system. Thus it is desirable to have the smallest jitter buffer adequate to adjust for the amount of jitter present in the network.

Dynamic Sizing of Jitter Buffer to Adapt to Changing Run Conditions

Figure 5:
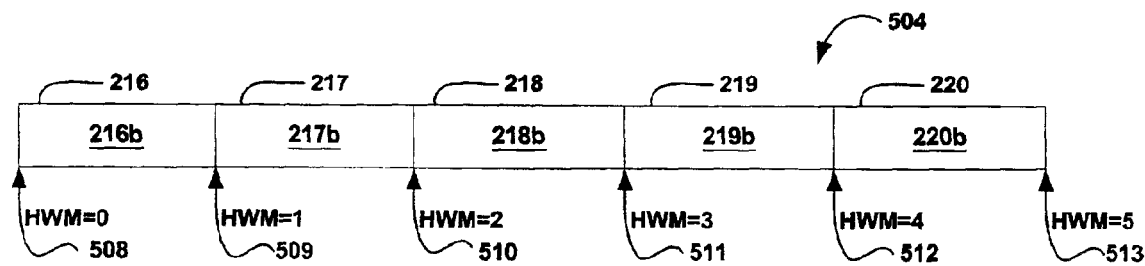
FIG. 5 is a block diagram representing a jitter buffer in accordance with the present invention.

FIG. 5 depicts a jitter buffer 504 in accordance with the present invention. It should be understood that the particular number of elements in jitter buffer 504 as depicted in FIG. 5 is in all ways an arbitrary one and selected for exemplary purposes only. The scope and spirit of the invention encompasses a jitter buffer of any appropriate size and number of elements. In a preferred embodiment jitter buffer 504 may be an array but it should be understood that the present invention contemplates the use of any suitable data structure.

In accordance with the present invention, the size of jitter buffer 504 is automatically adjusted in response to changing network and system run conditions that an audio communications application encounters. Reproduction of packets containing audio data placed in jitter buffer 504 does not occur until a certain number of packets are received. The number of packets that must be received before playback of the packets begins is called the high-water mark 508, 509, 510, 511, 512 or 513. The present invention determines the high-water mark 508, 509, 510, 511, 512 or 513 that most closely results in a target error rate for the application, given the current conditions of the network and the host systems and dynamically adjusts the current high-water mark to that value.

Reproduction of packets containing audio data placed in the jitter buffer does not occur until a certain number of packets are received. For example, if the high-water mark is three 511, then jitter buffer 504 will not release packets for playback until three packets have been received and stored in jitter buffer 504 or until a time equivalent to three packets since the first packet of the talkspurt was received has passed. Thus if a talkspurt contains 2 packets, each packet representing 100 ms of play, and the high-water mark is 3, play will commence 300 ms after receiving the first packet. This delays the start of playback by three packets, thereby providing a delay three packets in length, which in the example cited above is 300 ms. Playback errors are tracked and the size of jitter buffer 504 is modified as a function of how many errors in playback occur.

The present invention determines the high-water mark that most closely results in the target error rate for the application, given the current conditions of the network and the host systems. If there is a great deal of jitter, the high-water mark may be larger. If there is little or no jitter, such as may occur on a local area network with dedicated host machines, the high-water mark can be very small or even zero 508. On a wide area network with some congestion and non-dedicated hosts, the high-water mark may be much higher. Conditions within the same network configuration may change over time and therefore the high-water mark that results in the closest approximation to the target error rate for the application may change over time. The present invention automatically adjusts the length of delay to achieve the error rate that most closely approaches the target error rate.

The present invention monitors and tracks the error rate experienced at different high-water marks and dynamically selects the high-water mark that provides the error rate closest to the target error rate selected for the application. This provides the application with the lowest latency (delay) achievable at its target error rate, regardless of the environment in which the application is deployed. No user intervention is required for an application using the present invention in order to adapt to these different circumstances. If conditions change while the application is running, the present invention will change the high-water mark to adapt.

Figure 6:
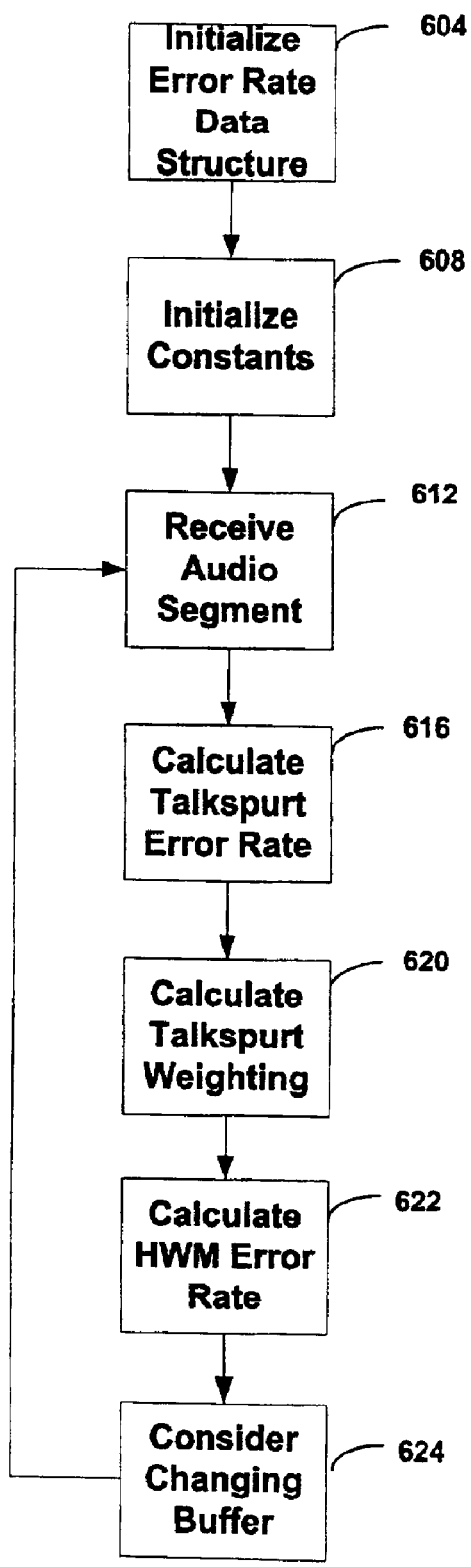
FIG. 6 is a flow diagram of an exemplary process for dynamic allocation of the size of a jitter buffer in accordance with the present invention.

Referring now to FIG. 6, in combination with FIG. 5, at step 604, all elements of an array or other suitable data structure in which is stored the error rate experienced at each possible high-water mark 508, 509, 510, 511, 512 or 513, are set to equal the target error rate for the application. The target error rate will not be the same for every application because generally the lower the error rate required, the longer the latency will be, which is to say, target error rate is generally inversely proportional to latency. Each application may have a different target tradeoff between latency and error rate. For example, a lecture application where one person does all the speaking and others do all the listening can tolerate a very high latency (perhaps several seconds) and will therefore be able to achieve a very low error rate. An interactive application in which two users are having a two-way conversation (similar to a traditional telephone conversation) will require lower latency, but will still demand a relatively low error rate. A gaming application which implements audio communication may require audio playback with low latency but may be willing to tolerate a higher error rate in order to achieve the desired lower latency.

At step 608, the current high-water mark 508, 509, 510, 511, 512 or 513, representing the number of packets that must be received before reproduction (such as playback) begins, is set to an application-defined value appropriate for the application. The current high-water mark 508, 509, 510, 511, 512 or 513 is initially an estimate of the length of delay that is required to achieve the desired error rate. After the application is run for the first time, the ending current high-water mark may be saved and used to initialize the starting high-water mark the next time the application is run.

As previously discussed, the target high-water mark is application-dependent because as the high-water mark is increased, the incidents of errors in the playback stream approach zero. An error occurs when a packet necessary for uninterrupted playback is not available (not in the jitter buffer) when it is supposed to be played. Thus, if a user is willing to wait an infinitely long time for a packet to be delivered, unless the packet has been lost by the network, eventually the packet will arrive and thus the error rate will be zero. However this also means that there will be an infinite latency to the audio playback.

For example, referring concurrently to FIG. 3 and FIG. 5, suppose transmitting device 20a sends packet 216 (a 100 ms packet) at time 0, packet 217 at time 0+100 and packet 218 at time 0+200. If a receiving device 20b receives packet 216 at time 0+10, packet 217 at time 0+230 and packet 218 at time 0+210 and the high-water mark is 1 509, at time 0+110 packet 216 will start to play. At time 0+210, packet 217 is needed to play but since packet 217 will not arrive until time 0+230, packet 217 is not available for playback at time 0+210. The listener hears silence. This is counted as an error. At time 0+230, packet 217 arrives "late," and is discarded. If the high-water mark had been changed to 2 510, it would have allowed enough time for packet 217 to arrive before it was needed to play (at time 0+310), packet 217 would not have been discarded, no error would have resulted, but latency would have been increased by 100 ms.

At step 612, an audio segment such as a talkspurt is received. Audio communications applications on packet-based networks often transmit audio data in audio segments called talkspurts. Talkspurts contain variable numbers of packets containing audio data. When a user begins speaking, the software begins transmitting a series of packets to the destination and when the user stops speaking, the application stops transmitting packets.

At step 616, the number of errors in each talkspurt is counted. The number of packets in the talkspurt is counted. The error rate is then calculated in accordance with the following formula:

Error rate=the minimum of ((total number of errors in the talkspurt/number of packets in the talkspurt), 1).

Thus if a given talkspurt contained 4 packets, and there were a total of 4 errors in the talkspurt, the error rate for this talkspurt would be min((4/4), 1) or 1. Likewise if a given talkspurt contained 4 packets, and there was a total of 1 error in the talkspurt, the error rate for the talkspurt would be calculated as min((1/4), 1) or 0.25.

The maximum value for error rate is 1, representing one or more errors for each packet in a talkspurt. Every time data is required for playback but has not arrived, it is counted as an error. Note that this can happen more times than there are packets in a talkspurt, hence the minimum function. For example, if a 100 mns packet arrives 310 ms late, 3 errors are counted, one error for each time the packet was needed but had not yet arrived.

An error rate of 0 represents no errors. Every time a packet arrives late, it is counted as an error. A packet that does not arrive by the time the next talkspurt is played, however, is not defined as an error but as lost. A lost packet is not counted as an error because increasing the high-water mark to adapt to a lost packet will not increase the probability that future packets will be successfully delivered. Hence increasing the high-water mark will not result in a lower error rate.

At step 620, talkspurts may be weighted in accordance with the following formula:

Talkspurt weighting=minimum ((constant*number of packets in the talkspurt), 1).

The constant in the formula above represents how much weight is assigned to each packet of audio data, or, in other words, how much effect the error rate of a given talkspurt will have on changing the high-water mark. The constant may be set by the application in step 608. If it is anticipated that network conditions will be changing quickly, and it is desired that the high-water mark will change correspondingly rapidly, the constant may be set to a high value. If it is anticipated that network conditions are relatively stable, the constant may be set to a low value so that changes to the high-water mark occur relatively slowly. For example, if network conditions are changing rapidly, the weighting constant may be set to a high number, such as 1. If there are 4 packets in a talkspurt, the resulting talkspurt weighting will be:

Talkspurt weighting=min (4, 1) or 1.

If network conditions are generally stable, the weighting constant may be set to a low value such as 0.1. Given the same 4 packets per talkspurt, the resulting talkspurt weighting will be:

Talkspurt weighting=min (0.4, 1) or 0.4.

Thus, for a weighting constant of 0.4, the difference between the value of talkspurt weighting for an audio talkspurt containing one packet and one containing two packets is twofold:
For the audio talkspurt containing one packet:

Talkspurt weighting=minimum ((constant*number of packets in the talkspurt), 1).

Talkspurt weighting=min ((0.4*1), 1)=0.4

And for a talkspurt containing two packets:

Talkspurt weighting=min ((0.4*2), 1)=0.8

Of course, where the weighting constant multiplied by the number of packets exceeds one, this proportional relationship will no longer exist. For example, for a talkspurt containing 10 packets:

Talkspurt weighting=min ((0.4*10), 1)=1

In this case increasing from one packet (talkspurt weighting=0.4) to 10 (talkspurt weighting=1) does not result in a proportional (tenfold) increase in talkspurt weighting.

After the talkspurt weighting is determined for the current talkspurt, the error rate for the current high-water mark is calculated at step 622, in accordance with the following formula:
The element of the array corresponding to the current high-water mark is set to:
The error rate of the current high-water mark*(1−talkspurt weighting from step 620)+talkspurt error rate from step 616\*talkspurt weighting.

For example, in the case where:
Target error rate=0.2
Current high-water mark=3
Talkspurt weighting=1
Error rate for the present talkspurt=0.4
Existing error rate for high-water mark (3) stored in the array=0.25
Existing error rate for high-water mark (4) stored in the array=0.2
The new error rate for the current high-water mark (3) would be calculated as:

0.25*(1−1)+0.4*1 or 0.4

The error rate for high-water mark (3) (previously 0.25) would be changed to 0.4.

Thus if a talkspurt with a higher (worse) error rate than the current error rate is encountered, the error rate stored in the array for the current high-water mark may be increased. The current high-water mark may be also increased, effectively increasing the delay before playback.

To decide whether or not to increase the size of the high-water mark, the error rate at the current high-water mark is compared to the error rate at the next higher high-water mark. Whichever high-water mark whose corresponding error rate is closer to the target error rate becomes the current high-water mark. Hence, in the example, to determine if the high-water mark should be increased, a comparison is made between the error rate at a high-water mark of 3 (0.4) and the error rate at a high-water mark of 4 (0.2). Since 0.2 is closer to the target error rate of 0.2 than is 0.4, in this case the current high-water mark will be changed from 3 to 4 and the next talkspurt will be processed.

Similarly, if the new value of the error rate for the current high-water mark is lower than the target error rate, the high-water mark may be reduced by one packet.

In accordance with another embodiment of the invention, the new value of the error rate for the current high-water mark may be compared with a given range of allowable variation from the target error rate before the array element is updated. If the new error rate is not within the allowable range, the error rate in the array for that high-water mark is set to the low end value or high end value of the allowable range that is closer to the calculated error rate.

In accordance with another aspect of the invention, the high-water mark is not changed unless the error rate for the current high-water mark differs from the target error rate by a certain given percentage (e.g. 20%) or by a certain absolute amount(e.g. 0.1).

According to another aspect of the invention, the target error rate is not constant for the application, but instead changes depending on latency and error rate. As latency increases, a different tradeoff between latency and error rate may be desired. For example, if the network has low jitter and a selection is being made between a high-water mark of 1 or 2 packets (perhaps translating into a delay of 50 ms versus 100 ms) since either latency is quite low, the target error rate should be very low (approaching zero). If, however, a choice must be made between high-water marks in the 8 to 12 range (perhaps translating into delays between 400 ms and 600 ms), the target error rate should be set higher to keep latency lower. Thus a target error rate may be associated with each high-water mark such that the target error rate for a lower high-water mark may be lower than that for a higher high-water mark.

In accordance with this aspect of the invention, each high-water mark is assigned its own factored target error rate according to the following formula:

$$\text{Constant} * 2^{\frac{N * \text{ms per packet}}{1000}}$$

where N represents the value of the current high-water mark and ms per packet represents the number of milliseconds in a packet. Thus for a packet length of 100 ms, where the constant equals 0.01, the factored target error rate for a high-water mark of 1, (N=1), would be 0.01 times 2 to the power of 0.1 or 0.01071773462536. The factored target error rate for a high-water mark of 10, (N=10), would be 0.01 times 2 or 0.02.

According to another aspect of the invention, the present invention places incoming packets into a jitter buffer, placing packets received out of order back into order in the buffer. For example, suppose that a transmitter transmits a talkspurt containing packet 216, packet 217 and packet 218. Although the transmitter transmits the packets in order (first 216, then 217, then 218), the receiver may not receive the packets in that order. Because not every packet will follow the same route through a network, the receiver may receive packet 216, then packet 218 and then packet 217. In accordance with the present invention, when packet 216 is placed in the jitter buffer, it will be placed in the jitter buffer in position one for than talkspurt. When packet 218 is received, packet 218 will be placed in the jitter buffer in position three for that talkspurt and when packet 217 is received, packet 217 will be placed in the jitter buffer in position two for the talkspurt, hence reordering packets into their proper playback order as the packets are placed into the jitter buffer.

In an alternate embodiment, packets received out of order are discarded. In a further embodiment, packets are placed in the buffer in the order in which the packets are received. According to one aspect of the invention, a lost packets is replaced by an empty packet (in an audio application, the listener would hear silence). In another embodiment of the invention, lost packets are ignored and the next available packet is played.

Once the number of packets of audio data at least equal to the current high-water mark is reached the data is ready for playback. It should be noted, however, that as previously discussed, if the length of a talkspurt is smaller than the length of jitter buffer 504 as determined by high-water mark 508, 509, 510, 511, 512 or 513, the queue will release the talkspurt when an equivalent amount of time has passed since the first packet of the talkspurt was received. Thus, if the length of a received talkspurt is 4 milliseconds, but the length of the jitter buffer is 5 milliseconds, after 5 milliseconds have passed from the beginning of the receipt of the talkspurt, the talkspurt will be released from the jitter buffer.

The described invention is appropriate for a computing system that transmits and receives fixed length packets of audio (for example, each packet contains audio data that will take 1 millisecond to play). In such an embodiment the high-water mark would represent a number of packets (e.g. 5 packets) corresponding to a length of delay before playback begins. Since each packet contains 1 millisecond of playback audio, the 5 packets represent 5 milliseconds of audio playback. Since each packet contains the same length of audio data (measured in time), the present invention tracks the number of packets received and stored sequentially in an array or other suitable data structure before playback begins, resulting in a 5 millisecond length of delay before playback.

The described invention is also appropriate for systems that use variable length packets of audio (that is, each packet does not contain the same amount of audio data). In such an embodiment the high-water mark would represent some number of milliseconds of audio playback (say 5 ms of playback) which may not represent a set number of packets. For example, if packet 1 contained 1 millisecond of audio data, packet 2 contained 3 milliseconds of audio data and packet 3 contained 2 milliseconds of audio playback, the high-water mark would be 5 (representing 5 milliseconds of audio playback) so that in the above described instance, the audio data providing 5 ms of playback is received in three packets. When packet 2 arrives, 5 milliseconds of audio is not available to play. When packet 3 arrives, 6 milliseconds of audio is available to play. Because at least 5 milliseconds of playback is now available to play, playback can commence. It should be noted that although a particular number of packets and milliseconds has been described for exemplary purposes, the spirit and scope of the invention includes the use of any suitable number of packets or milliseconds for jitter buffer size.

Exemplary Computing Environment

Figure 7:
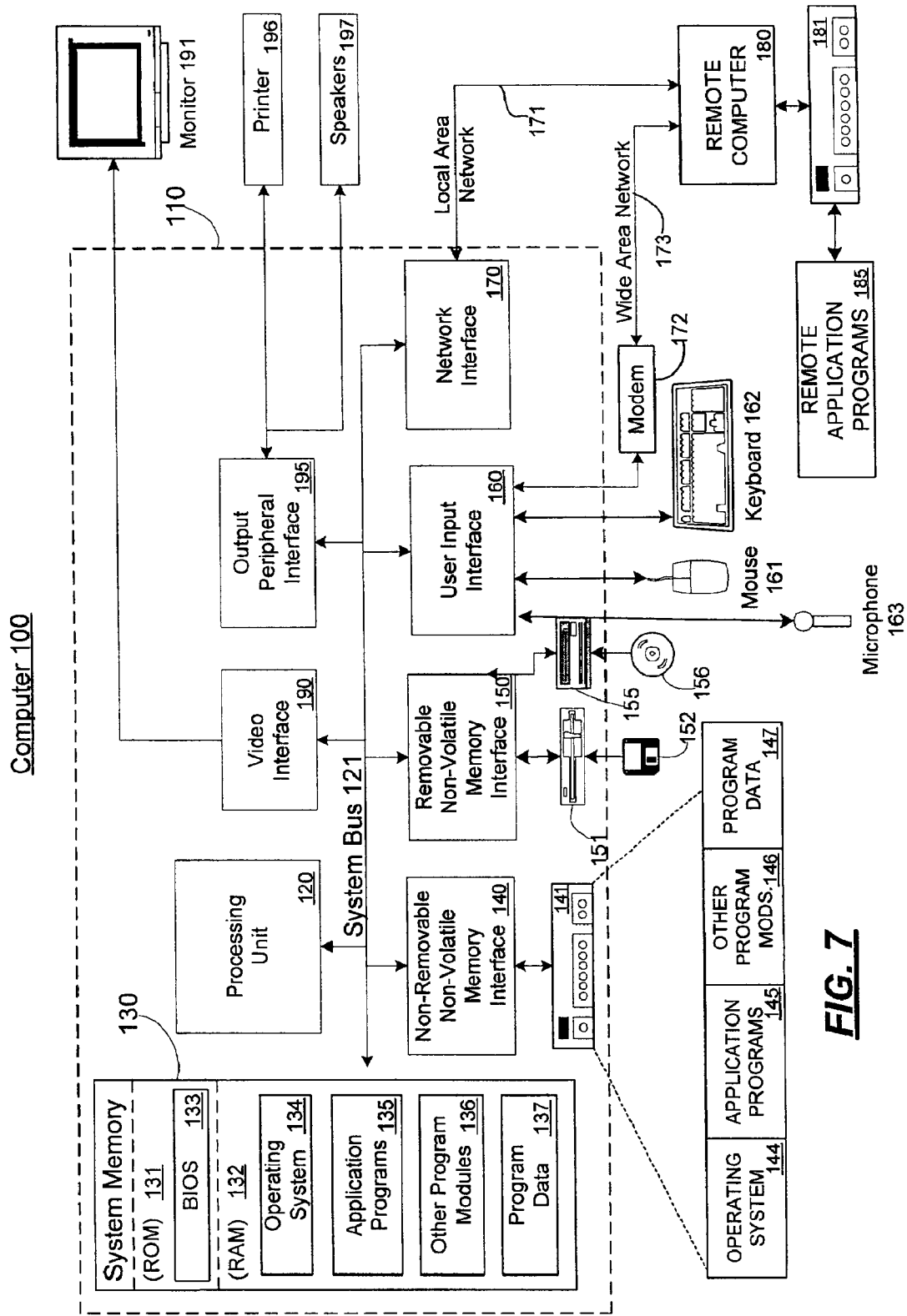
FIG. 7 is a block diagram of an exemplary computing environment in which aspects of the invention may be implemented.

FIG. 7 illustrates an example of a suitable computing system environment 100 in which the program code that embodies the methods or systems of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such, as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

Computer 110 may also include other removable/non-removable, volatile/nonvolatile computer storage media. By way of example only, FIG. 1 illustrates a hard disk drive 141 that reads from or writes to non-removable, nonvolatile magnetic media , a magnetic disk d rive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of reproducing an information stream from packets transmitted over a network, comprising:

providing a buffer associated with a length of delay;

inserting packets associated with a length of play received from the network into said buffer;

removing packets for reproduction from said buffer when said length of play of packets is about the same as said length of delay;

tracking reproduction errors associated with said length of delay; and adjusting said current length of delay to compensate for said reproduction errors, wherein adjusting said current length of delay to compensate for reproduction errors further comprises:

receiving a target error rate for reproducing said information stream;

computing a first error rate associated with a first length of delay, wherein computing said first error rate further comprises:

counting errors in a data segment containing packets of data;

counting said packets; and dividing said errors by said packets to determine said error rate for said first length of delay computing a second error rate associated with a second length of delay;

comparing said first error rate associated with said first length of delay with said target error rate; and comparing said second error rate associated with said second length of delay with said target error rate.

2. A method of reproducing an information stream from packets transmitted over a network, comprising:

providing a buffer associated with a length of delay;

inserting packets associated with a length of play received from the network into said buffer;

removing packets for reproduction from said buffer when said length of play of packets is about the same as said length of delay;

tracking reproduction errors associated with said length of delay;

adjusting said current length of delay to compensate for said reproduction errors; and establishing a weighting constant as a function of how quickly said length of delay is changed.

* * * * *